Aug. 2, 1932.   H. W. MEYER   1,869,857
FISHHOOK SNELLING MACHINE
Filed July 24, 1931   2 Sheets-Sheet 1
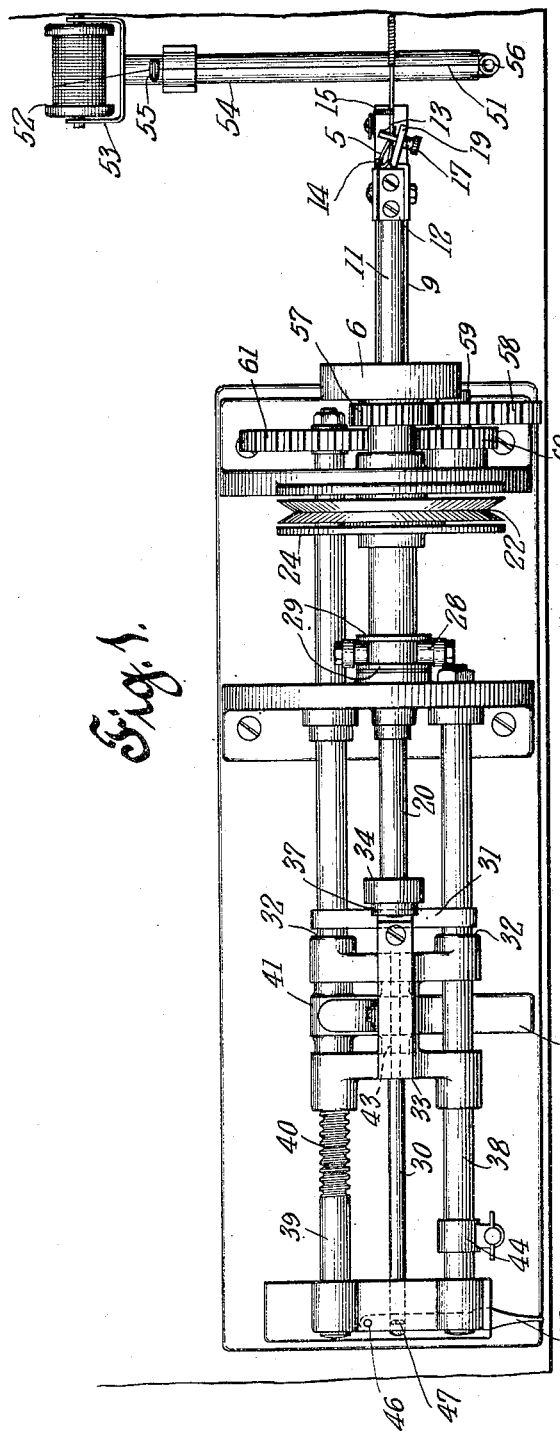
INVENTOR
Harold W. Meyer
BY
ATTORNEY

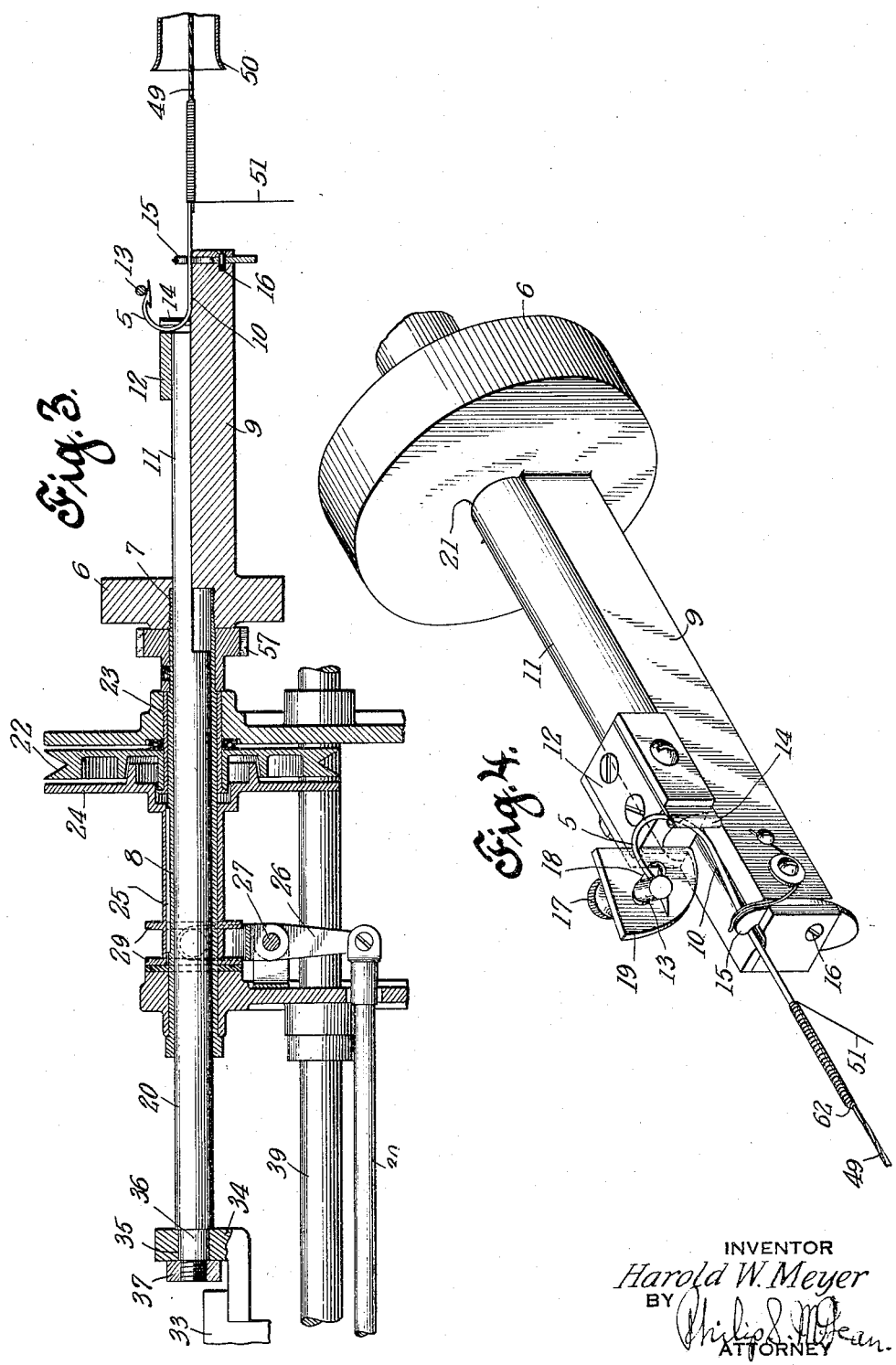

Patented Aug. 2, 1932

1,869,857

UNITED STATES PATENT OFFICE

HAROLD W. MEYER, OF BROOKLYN, NEW YORK

FISHHOOK SNELLING MACHINE

Application filed July 24, 1931. Serial No. 552,822.

This invention relates to fish hook snelling machines of the general type covered in the Louis E. Baltzley application Ser. 420,653, filed Jan. 14, 1930, Pat. No. 1,814,464.

The objects of the invention are to provide a machine of simple practical construction, which can be operated by unskilled labor to rapidly accomplish the snelling operations.

The novel features of construction, combinations and relations of parts by which the foregoing and other desirable objects are attained are set forth in the following specification and illustrated in the accompanying drawings.

The drawings show by way of example one practical embodiment of the invention, it being understood that the structure may be modified as regards the true spirit and broad scope of the invention.

Fig. 1 is a broken plan view of the machine; Fig. 2 is a broken front or edge view of the machine; Fig. 3 is an enlarged longitudinal vertical sectional view as on substantially the central plane of Fig. 1, with parts broken away; Fig. 4 is a further enlarged detached perspective illustration of the rotating hook holder and traverse mechanism.

In a machine of the present disclosure, the fish hook which is indicated at 5, is supported in longitudinally slidable relation on a rotating holder and in the course of such rotation is shifted longitudinally to effect the proper feed for the winding which secures the "gut" or snell to the shank of the hook.

The special hook holder is shown in detail in Figs. 3 and 4 as consisting of a head 6 screwed at 7, onto the end of a hollow rotating shaft 8 and as carrying a projection 9 in line with and constituting an extension of the shaft, such shaft extension being longitudinally grooved or slotted at 10, substantially along the axis of the shaft to form a seat for the back or shank of the hook and there being a slide 11 operating over this shaft extension and carrying a head block 12 provided with means for slidingly holding the hook in its seat 10.

The hook holding means illustrated, consists of a pin or stud 13, positioned to engage over the barb of the hook and a side gage 14, disposed to hold the laterally twisted neck or loop of the hook. Also there is shown in the illustration a spring pressed pawl 15, pivoted at 16 at the end of the holder shaft and having a hooked or angled end to engage over the shank of the hook resting in the longitudinal guide groove or seat 10.

To adapt the holder for different sizes of hooks, the stud 13 is shown as adjustably secured by a screw 17 in an inclined slot 18, provided in a plate 19, secured in inclined projecting relation on the end of the clamp head 12.

The slide 11 which advances the hook along the rotating support is illustrated in Fig. 3 as the half round extension of a shaft 20, received within the tubular shaft 8 and projecting from the end of the latter through a half round guide opening 21 in the head portion 6 of the hook support. The latter construction accurately guides the projecting slide and also "keys" it to rotate with the hook support.

The tubular hook supporting shaft 8 is rotated in the present disclosure by pulley 22, grooved to receive a driving belt, this pulley being journalled to rotate freely on a fixed bearing sleeve 23, which latter forms also a bearing for the tubular shaft and said pulley being coupled to the shaft through the medium of a clutch disc 24 slidingly keyed on the tubular shaft at 25 and operated for clutching and unclutching purposes by a shipper fork 26 pivoted on the frame of the machine at 27 and carrying rolls 28 entered between spaced flanges 29 on the end of the clutch sleeve.

At the end of each winding operation, a declutching action is effected by means of a rod 30 connected with the lower end of the shipper fork and carrying an adjustable abutment 31, positioned for engagement by shoulders 32, on the end of a sliding carriage 33.

The sliding carriage 33 is the device which imparts the feed movement to the winding traversing shaft 20 and it is equipped for the purpose with a bracket 34, having a bearing 35, rotatably receiving the shouldered end portion 36 of shaft 20, this shouldered end portion being confined in this carriage bearing by a nut or other abutment 37 secured on the end of the shaft.

The feed carriage is shown as slidably sleeved over parallel related fixed rod 38 and rotating shaft 39 and for feed purposes, the latter is formed with a screw thread 40 engaged by a half nut 41, carried by spring pressed lever 42, pivoted on the carriage at 43.

An abutment stop 44 is shown adjustably clamped on the stationary carriage supporting rod 38 to limit the back throw of the carriage and hence the initial positioning of the feeding member of the hook holder. The travel of the carriage in the reverse or feeding direction is limited by the stop 31, which when engaged by the shoulders 32 of the carriage operates the fork to unclutch the drive shaft.

To restore the clutch and start the machine, the clutch rod 30 is shiftable by hand lever 45, pivoted on the base of the machine at 46 and connected with the end of the clutch rod at 47. A spring cam is indicated at 48 in Fig. 2 for releasably holding the clutch controlling lever 45 in either of its two positions.

The gut, snell or leader, etc., which is to be attached to the hook is designated 49 and, as shown in Fig. 3, may be loosely guided or supported within a throat or tubular guide 50 mounted in spaced opposition to the end of the rotating hook holder.

The thread, cord, wire or other material used as a wrapping for securing the snell to the shank of the hook is designated 51 and is shown as supplied from a spool 52, removably journalled in the forks of a spring holder 53 on the end of a tubular support 54, carrying a thread guide 55, adjacent the spool and a second guide 56 at the opposite end and closer to the hook shank, the latter guide determining the "winding-on" point.

The drive of the carriage feed screw is accomplished in the illustration by back-gearing consisting of a pinion 57 on the tubular main shaft in mesh with a gear 58 on a stub shaft 59 and carrying a pinion 60 in mesh with gear 61 on the end of the screw shaft 39.

In Figs. 1, 2 and 3, the parts are illustrated in the de-clutched condition as when the starting and stopping handle 45 is shifted to the right to operate the fork 26 to throw out the drive clutch on the main shaft. Under such conditions, this shaft remains at rest even with the belt pulley 22 turning with the motor. A hook in the machine may then be detached by forcing back the spring holding hook 15, Fig. 4, either by pressure directly applied to the same or by simply lifting upward on the shank of the hook as the parts appear in this figure, such motion having the effect of releasing the shank of the hook and an outward pull then releasing the barb of the hook from beneath the holding lug 13. By thrusting down the projecting lever 42, the half nut 41 may be freed from the feed screw and the carriage then thrown back against the back stop 44. In this initial or retracted position of the carriage, a new hook may be inserted in the holder by forcing the loop of the same beneath the holding lug 13 and catching the shank beneath the spring holding hook 15, the shank of the hook then lying in the positioning groove 10 and the twist in the barbed portion of the hook causing it to rest in between the side gage 14 and the inclined face gage 19. In such relation, the hook is firmly but releasably held with its shank substantially in line with the rotating axis of the drive shaft. The snell may then be located in the guide or support 50 with its end portion in overlapping relation to the hook shank. After a first turn or so of the wrapping thread is made about the lapped portions of the shank and snell as indicated at 62, the machine may be started by throwing the hand lever 45 to the left in Figs. 1 and 2 to engage the clutch at 24, Fig. 3. The rotation of this shaft effects rotation of the hook holder to wind the thread on over the lapped portions of the shank and snell and the advance of the carriage effected through rotation of the feed screw from the main shaft causes the slide to push the hook along in the holder at a rate determined by the pitch of the feed screw and the gearing from the main shaft to the screw shaft. As the winding is completed, the carriage engages the stop on the clutch rod to accomplish the de-clutching operation and the stoppage of the machine. The lug 13 of the hook holder is preferably so located as to compress or squeeze in the loop of the hook and thereby cause the hook to be yieldingly held in its seat partly by its own spring tension. This arrangement also compensates for slight variations in size or shape of the hooks. The winding-on operation is all at one end of the machine exposed to clear view and with all parts readily accessible to the operator. This is particularly advantageous for the placing and removal of the hooks and for the cutting and tying operations with the winding material. The feed screw structure and other parts may be simplified or changed within the true scope of the invention.

While the method described and the construction illustrated are considered the best practical embodiment of the invention at present, it should be clear that modifications and changes may be made, within the broad intent of the following claims.

What is claimed is:

1. A fish hook snelling machine comprising a rotating hook holder, associated means for properly relating a snell with the shank of a hook held in the rotating hook holder, winding-on means and means for effecting traverse movement of the rotating hook in the holder relative to the winding-on means.

2. In a machine of the character disclosed, the combination of a rotating hook holder, non-rotating winding-on means and means for effecting relative traverse of said rotating hook holder and the non-rotating winding-on means.

3. In a machine of the character disclosed, the combination of a rotating hook holder, non-rotating winding-on means and means for traversing the hook carried by the holder in relation to said non-rotating winding-on means.

4. In a machine of the character disclosed, the combination of an axially shifting rotating hook holder, means for supplying a wrapping along the shank of a hook carried by said rotating and axially shifting hook-holder and means for axially shifting said rotating hook holder and for stopping rotation of said holder at the end of a predetermined axial shifting movement of the same.

5. In a machine of the character disclosed, the combination of an axially shifting rotating hook holder, a snell guide spaced axially from said hook holder and winding-on means in the space between the hook holder and snell guide.

6. In a machine of the character disclosed, the combination of a rotating member having a longitudinal guide groove substantially at the axis of the same a slide carried by and slidingly keyed to said rotating member and operating longitudinally of said rotating member, hook holding means carried by said guide for slidingly confining a hook in said guide groove and means for advancing said slide longitudinally of said rotating member and for stopping rotation of said member at the end of a predetermined advancing movement of the slide.

7. In a machine of the character disclosed, the combination of a rotating member having a longitudinal guide groove substantially at the axis of the same, a slide operating longitudinally of said rotating member, hook holding means carried by said slide for confining a hook in said guide groove, said hook holding means including a pin for engagement over the barb portion of the hook resting in the groove.

8. In a machine of the character disclosed, the combination of a rotating member having a longitudinal guide groove substantially at the axis of the same, a slide operating longitudinally of said rotating member, hook holding means carried by said slide for confining a hook in said guide groove, said hook holding means including a pin for engagement over the barb portion of the hook resting in the groove and the rotary member having a hook element releasably engaging over the shank portion of a hook seated in the groove.

9. A hook holder for snelling machines comprising a member having a groove for the shank of a hook, a gage face inclined to said groove and a barb confining pin carried by said gage face.

10. A hook holder for snelling machines comprising a member having a groove for the shank of a hook, a gage face inclined to said groove, a barb confining pin carried by said gage face and means for adjustably securing said pin in the gage face to adapt said hook holder for different size and shape hooks.

11. A hook holder for snelling machines comprising a tubular shaft having a projecting portion provided with a hook shank guiding groove along the axis of rotation, a slide overlying said projecting portion, hook confining means carried by said slide and feed screw mechanism for advancing said slide relative to the shaft.

12. A hook holder for snelling machines and the like comprising a tubular shaft, a member at one end of said shaft having an opening and a projection on substantially the axial center of the shaft, a rod shiftable longitudinally in said tubular shaft and having a portion projecting through said opening over the projecting portion of the member aforesaid, means for shifting said rod in the tubular shaft and hook engaging means carried by the projecting portion of said rod.

13. A hook holder comprising a member provided with a guide groove, means for releasably confining the shank portion of a hook in said groove and gage means for holding the doubled portion of a hook under compression to thereby yieldingly retain the hook seated in said groove.

14. A hook holder comprising a member provided with a guide groove, means for releasably confining the shank portion of a hook in said groove, gage means for holding the doubled portion of a hook under compression to thereby yieldingly retain the hook seated in said groove, said gage means including a confining pin and a gage plate supporting said pin and inclined relatively to the groove to substantially fit the angular twist of the barb portion of a hook.

15. A snelling machine comprising in combination a guide for winding material, a rotating hook holder for holding and rotating a hook with its shank portion adjacent said guide, means for traversing the rotating hook longitudinally of the shank of the same and a stationary guide for supporting a snell in axial alignment with the shank of the rotating hook.

16. In a machine of the character disclosed, the combination of an axially shifting rotating hook holder, means for supplying a wrapping along the shank of a hook carried by said rotating and axially shifting hook holder, including a stationary guide for winding material located in fixed relation at one side of and adjacent the shank of the hook, and means for axially shifting said hook holder a predetermined extent and for stopping the rotation of the hook holder at the end of the predetermined axial shifting movement of the same.

17. In a machine of the character disclosed, the combination of a rotating member, a slide carried by and rotating therewith and sliding longitudinally of the same, means carried by said slide for slidingly confining a hook on said rotating member and whereby said hook may rotate with and travel longitudinally of the rotating member and winding-on means associated with the rotating and axially shifting hook holding means aforesaid.

18. In a machine of the character disclosed, the combination of a rotating member, a slide carried by and rotating therewith and sliding longitudinally of the same, means carried by said slide for slidingly confining a hook on said rotating member and whereby said hook may rotate with and travel longitudinally of the rotating member and winding-on means associated with the rotating and axially shifting hook holding means aforesaid, and including a stationary guide for the winding material located closely adjacent the axis of said rotating and axially shifting hook holding means.

19. In a machine of the character disclosed, the combination of a rotary shaft member having a substantially axially located longitudinally extending groove in the end portion of the same for seating the shank part of a hook and means overstanding said grooved portion of the shaft member for engagement with the loop portion of a hook seated in the groove as aforesaid.

20. In a machine of the character disclosed, the combination of a rotary shaft member having a substantially axially located longitudinally extending groove in the end portion of the same for seating the shank part of a hook, means overstanding said grooved portion of the shaft member for engagement with the loop portion of a hook seated in the grove as aforesaid and said means including an abutment adjustable in relation to said grooved portion to engage the loops of different size hooks.

21. In a machine of the character disclosed, the combination of a rotary shaft member having a substantially axially located longitudinally extending groove in the end portion of the same for seating the shank part of a hook and hook confining means longitudinally shiftable on said shaft member and including a retainer for the loop part of a hook seated in the groove as aforesaid.

22. In a machine of the character disclosed, the combination of a rotary shaft member having a substantially axially located longitudinally extending groove in the end portion of the same for slidingly seating the shank part of a hook and spring tensioned means for holding the shank portion of the hook slidingly seated in said groove.

23. In a machine of the character disclosed, the combination of a holder for holding a hook with the shank portion of the same projecting free for receiving a wrapping, means for rotating and effecting longitudinal travel of said hook holder and wrapping guiding means operatively associated with said hook holder.

24. In a machine of the character disclosed, the combination of a holder for holding a hook with the shank portion of the same projecting free for receiving a wrapping and including positioning and holding devices for both the shank portion and the loop portion of a hook, means for rotating and effecting longitudinal travel of said hook holding means and wrapping guiding means operatively associated with said hook holder.

25. In a machine of the character disclosed, the combination of a rotary shaft member, means carried by the end portion of said shaft member for retaining a hook thereon with the shank of the hook substantially in line with the axis of rotation and projecting from the end of the shaft member, a guide for winding material adjacent said end portion of the rotating shaft member and means for effecting longitudinal travel of the rotating hook as the wrapping operation progresses and including mechanism adjustable to stop the rotation of said shaft member at the end of a selected longitudinal travel of the hook.

26. In a machine of the character disclosed, the combination of concentric shaft and sleeve members slidingly keyed together and rotatable together and slidable longitudinally one in respect to the other and companion hook holding devices carried by said sleeve and shaft members.

27. A machine of the character disclosed, comprising a rotating member having a holder with a longitudinally extending seat for slidingly supporting the hook end of a fish hook with the shank of the hook projecting from the end of the member and substantially in line with the axis of rotation of said member and whereby the shank portion of the supported hook projecting substantially axially from the rotating member is positioned for the progressive application of a wrapping thereover by the rotary and sliding advancement of the hook and means for automatically effecting the sliding advancement of the hook in said seat in the rotation of said holder.

28. A machine of the character disclosed, comprising a rotating member having a holder for slidingly supporting the hook end of a fish hook with the shank of the hook projecting from the end of the member and substantially in line with the axis of rotation of said member and whereby the shank portion of the supported hook projecting substantially axially from the rotating member is positioned for the progressive application of a wrapping thereover by the rotary and sliding advancement of the hook and associated winding-on means for progressively applying a wrapping to the projecting portion of a hook shank as it advances from said rotating member.

29. In combination, a rotating member having a holder for receiving and supporting the hook end of a fish hook with the end of the shank of the same exposed substantially to the axis of rotation of the rotating member and means for effecting longitudinal travel of the holder in the rotation of the same for progressively advancing a wrapping about the shank of the supported hook.

30. In a hook snelling machine, a rotating hook holder having a longitudinal seat for the back or shank portion of a fish hook positioned substantially along the axis of rotation of the holder and recessed to receive the looped end of the hook and having a part overstanding the barbed portion of a hook positioned in said seat, whereby to automatically locate and releasably confine a hook with the shank of the same in position to receive a winding thereon.

31. In a hook snelling machine, a rotating hook holder having a longitudinal seat for the back or shank portion of a fish hook positioned substantially along the axis of rotation of the holder and recessed to receive the looped end of the hook and having a part overstanding the barbed portion of a hook positioned in said seat, whereby to automatically locate and releasably confine a hook with the shank of the same in position to receive a winding thereon, said barb confining part overstanding the shank seat being shiftable toward and away from said shank seat and thereby adapting the holder to receive and properly hold hooks of different sizes.

32. A machine of the character disclosed, comprising a rotating member having a seat for automatically positioning a fish hook with the shank of the hook projecting from the end of the member substantially in line with the axis of rotation of said member and a part overstanding said seat to engage over the barb portion of a hook so seated to thereby yieldingly secure the hook in said seat partly by the spring tension in the bend of the hook, and a stationary guide for winding material located in definite relation at one side of and adjacent the shank of the supported hook.

33. A machine of the character disclosed, comprising a rotating member having a holder for slidingly supporting the hook end of a fish hook with the shank of the hook projecting from the end of the member and substantially in line with the axis of rotation of said member and whereby the shank portion of the supported hook projecting substantially axially from the rotating member is positioned for the progressive application of a wrapping thereover by the rotary and sliding advancement of the hook and means for positively advancing the hook in such rotation of the same and including mechanism to interrupt the rotation of said member at the end of a predetermined advancing movement of the hook.

34. A machine of the character disclosed, comprising a rotating hook holder having a seat to automatically position the shank of a fish hook substantially in the axis of rotation of said holder, winding-on means associated with said hook holder and traversing means adjustable to effect the advance of the rotating hook a predetermined distance in respect to said winding-on means to thereby automatically predetermine the length of a wrapping applied to the hook shank.

35. A machine of the character disclosed, comprising in combination a rotating hook holder having means for automatically positioning a hook with the shank of the same in the axis of rotation of the holder and adjustable to hold hooks of different sizes, winding-on means associated with said rotating hook holder, means for effecting relative traverse of the rotating hook and winding-on means and including mechanism adjustable to automatically interrupt the rotation of the holder at the end of a predetermined wrapping action.

36. A hook holder for snelling machines comprising a tubular shaft having a projecting portion provided with a hook shank guiding groove along the axis of rotation, a slide overlying said projecting portion and rotating therewith, hook confining means carried by said slide over said groove and feed mechanism for advancing said slide relative to the shaft.

37. A hook holder comprising a member provided with a guide groove for receiving the shank portion of a hook and means overstanding said guide groove for holding the doubled portion of a hook seated in said groove under compression to thereby yieldingly retain the hook seated in said holder.

In testimony whereof I affix my signature.

HAROLD W. MEYER.